May 22, 1962 CHIH-CHUNG WANG 3,035,959

SORTING AND ETCHING APPARATUS AND METHOD

Filed April 10, 1958

INVENTOR.
CHIH-CHUNG WANG

BY Francis N. Nasselle

ATTORNEY

United States Patent Office 3,035,959

Patented May 22, 1962

3,035,959

SORTING AND ETCHING APPARATUS AND METHOD

Chih-Chung Wang, Lexington, Mass., assignor to Clevite Corporation, Cleveland, Ohio, a corporation of Ohio Filed Apr. 10, 1958, Ser. No. 727,647
6 Claims. (Cl. 156—17)

Figures 1, 2:
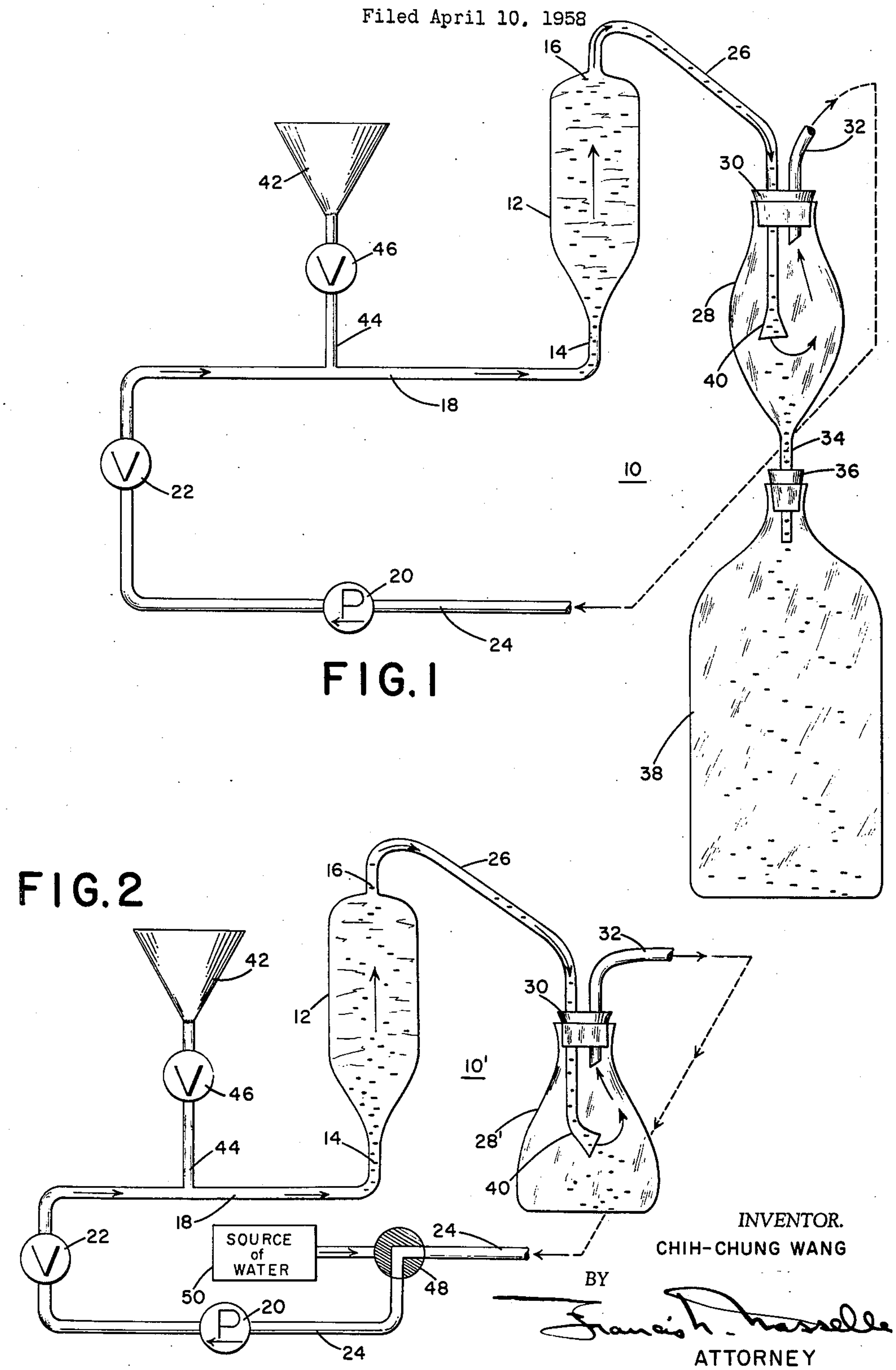

This invention relates to methods and apparatus for the chemical etching and sorting of particulate material.

For purposes of example and illustration, the invention is described herein as applied to the sorting and etching of platelets of semiconductive materials such as germanium and silicon, used in the manufacture of diodes and transistors. In the art, these platelets usually are referred to as "dice" or "wafers." It will be understood, however, that while the invention is of unique and particular advantage in the treatment of such semiconductor dice because of certain difficulties inherent in manufacturing semiconductor devices, it will be appreciated that the novel principles of the invention can be adapted or applied to other fields or manufacturing processes.

It is well known in the art of manufacturing semiconductor devices such as diodes and transistors, that the thickness of the relatively tiny germanium or silicon wafers which are the heart of such devices is an important variable and must be carefully controlled in the fabrication procedure.

Conventionally the semiconductor dice which, for example, may have dimensions in the order of .040" x .040" x .003", are sorted on the basis of their thickness dimensions by means of micrometer dial guages or similar devices which involve mechanical contact with the dice surfaces. Aside from the fact that such sorting techniques are tedious and time consuming, they have the additional disadvantage of causing damage to and/or contamination of the surface of the dice. With regard to the latter, it is well known in the art that the condition of the wafer surface is a matter of prime importance in manufacture of semiconductor devices. To assure that dice surfaces are in optimum condition with respect to cleanliness and smoothness, these surfaces usually are subjected to chemical or electro-chemical etching procedures. Since the etching cleans and conditions the dice surfaces by eroding material, dimensions of the dice are reduced; consequently, the thickness must be measured after etching and when this is performed in the conventional way it tends to result in contamination and/or physical damage to the dice surface. Thus, the benefits of the etching frequently are undone, to a large extent, during the sorting operation.

Aside from the matter of sorting or classifying wafers, etching provides a problem of its own. As a matter of economic necessity, semiconductors wafers are etched in batches ranging from a few hundreds to tens of thousands. Conventionally, this is done by immersing the dice in the etching solution in a suitable container; the dice, therefore, are piled up upon each other with the result that etching is not uniform.

The present invention contemplates novel methods and apparatus for sorting, etching, and for simultaneously and automatically etching and sorting semiconductor dice or platelets of other materials.

According to the present invention, a method of classifying platelets of a given material on the basis of their thickness dimensions comprises introducing the platelets into a confined body of fluid flowing vertically upward at a relatively constant, predetermined rate and in nonturbulent fashion, and collecting the platelets which are carried upwardly by the fluid flow.

According to another feature of the invention, a method of etching platelets of a given material comprises introducing the platelets into a confined body of etchant fluid flowing vertically upward, and adjusting the Reynolds number of the fluid flow system so that the platelets remain randomly suspended in the fluid to be etched thereby. When etching is completed a body of rinsing fluid is introduced in place of the etching fluid to terminate promptly the etching action.

According to still another feature of the invention, a method of etching platelets of a given material to a predetermined thickness comprises introducing the platelets into a confined body of etchant fluid flowing vertically upward and adjusting the Reynolds number of the fluid flow system so that platelets of said predetermined thickness are carried along by the fluid flow while thicker platelets remain randomly suspended in the fluid for further etching. The platelets carried upwardly are collected and rinsed to stop the etching action.

The invention also contemplates apparatus for carrying out the method in accordance with each of its particular features.

It is the fundamental general object of the invention to provide novel methods and apparatus for etching and classifying particulate material which overcome disadvantages of prior art methods and apparatus.

More specifically, it is an object of the invention to provide improved methods and apparatus for classifying material in the form of platelets on the basis of thickness dimension.

Another object is the provision of novel methods and apparatus for sorting wafers of semiconductive material according to thickness without contamination of, physical damage to, or mechanical contact with the surfaces.

Still another object is the provision of novel methods and apparatus for automatically etching semiconductor wafers en masse to a predetermined thickness and terminating the etching of each particular wafer as it achieves the desired thickness dimension.

These and further objects of the invention, as well as the manner of their accomplishment will be apparent to those conversant with the art from the following description and subjoined claims taken in conjunction with the annexed drawings, in which:

FIGURE 1 is a partially schematic side elevational view of apparatus according to the present invention; and FIGURE 2 is a view similar to FIGURE 1 illustrating a somewhat modified form of apparatus.

One form of apparatus contemplated by the present invention is illustrated schematically in FIGURE 1 wherein it is designated in its entirety by reference numeral 10. The apparatus comprises a flotation vessel 12, preferably taking the general form of a vertical cylinder, having an inlet opening 14 at its lower end and an outlet opening 16 at its upper end. The vessel preferably is of transparent material such as glass or plastic, and where the apparatus is used for etching, the material of the vessel as well as that of the remainder of the system should be resistant to attack by the etching fluid.

Means are provided to establish substantially nonturbulent or laminar flow of a fluid upwardly through vessel 12. To this end, a fluid conduit 18 runs to inlet 14 from the outlet of a suitable pump 20. The rate of fluid flow through conduit 18 and, thence, through vessel 12, is controlled by a suitable throttle valve 22. The inlet of pump 20 is connected by a conduit 24 a source of fluid (not shown) or, in a closed system as illustrated in FIGURE 1, conduit 24 recirculates fluid as will be seen as this description proceeds.

A conduit 26, connected to outlet 16 of vessel 12 passes into the upper end of a reflux separation vessel 28. In the illustrated embodiment separation vessel 28 is bulbar in form and vertically elongated; its upper end is closed by a stopper 30 or the like provided with apertures for conduit 26 and an outlet conduit 32, the latter connecting to conduit 24 to recirculate fluid.

The lower end of vessel 28 tapers downwardly to a tubular portion or neck 34 which passes through a stopper 36 in the neck of a collection bottle or flask 38.

Conduit 26 extends well into vessel 28 and terminates in a flared portion or bell 40 which acts to diffuse and reduce the velocity of fluid issuing from the conduit.

The dice or wafers to be treated are introduced into the fluid circulating system at a point upstream of inlet 14 to vessel 12 by a suitable storage and feeding unit represented diagrammatically by a hopper 42 connected to conduit 18 by a conduit 44. Feeding of dice from hopper 42 may be controlled in any suitable manner as represented by a valve 46 in conduit 44. In actual practice, it has been found convenient and satisfactory to form conduit 44 of flexible material such as rubber tubing and to use an adjustable clamp to regulate flow.

The system is filled with a fluid medium selected in accordance with the operation to be performed and the material to be handled. For sorting only, it is convenient and economical to use water and this has been found satisfactory for sorting small semiconductor wafers of germanium measuring from approximately 40 mils square by 3 mils thick to 150 mils square by 10 mils thick.

The flotation of wafers in vessel 12 depends on the Reynolds number characterizing the flow and this is a function of flow rate, density and viscosity of the fluid. For a given flow rate, the Reynolds number can be adjusted by adding a viscosity control agent such as carboxy methyl cellulose to water or a fluid or different density can be used.

For etching operations, a water solution of a suitable etching agent such as HF acid and $H_2O_2$ may be used and is satisfactory for wafers up to 150 x 150 by 10 mils thick. As in the case of the sorting operation, the Reynolds number of the flow may be controlled to suit the requirements of the particular material and range of particle sizes being handled.

The function of the apparatus described when used for simple sorting is as follows:

With the system filled and pump 20 running, valve 22 is adjusted to give a desired flow rate, the valve having been pre-calibrated to give a Reynolds number which floats particles of a desired size and produces non-turbulent flow in vessel 12. The wafers to be sorted are introduced into conduit 18 from hopper 42 and are carried through the conduit to vessel 12.

Under the laminar flow conditions in vessel 12, wafers of the desired size or smaller are carried upwardly through vessel 12 and conduit 26 and are discharged into vessel 28. Here the wafers settle to the bottom of the vessel and then through neck 34 into collection bottle 36. Fluid is forced out of vessel 28 through conduit 32 and thus recirculated through pump 20.

Wafers too large to be floated off remain in vessel 12; by raising the flow rate a predetermined amount, particles of a larger size than the first batch may be floated off from the remnants and collected in a different container. Thus, by raising the flow rate through a series of increments, a quantity of wafers can be separated into batches according to size.

In the etching operation, apparatus 10 is filled with a suitable etching fluid and the valve 22 adjusted to give a value of Reynolds number to float wafers of a particular size. All wafers of such size will be floated off as explained above, being etched in the process; oversize wafers remain in vessel 12 and continue to be etched. As the wafers are etched to the proper size, they are carried off and collected, the process continuing until all wafers have been transferred to collection vessel 38. Thus it will be seen that wafers are automatically etched to a predetermined size. In this type of operation, vessel 38 contains water to rinse the wafers and terminate the etching action. Preferably, suitable means (not shown) are provided to circulate fresh rinse water through collection vessel 36 and valve means (also not shown) are provided in neck 34 of vessel 28 to prevent the mixing of rinse water with etching solution. This valve means conveniently takes the form of a short length of flexible tubing and a pair of clamps.

Apparatus 10 may be operated to carry out a simple (i.e., non-automatic) etching operation and, in such a case, may be modified to the form shown in FIGURE 2 wherein like parts are designated by like reference numerals.

Apparatus 10′, FIGURE 2, is in all respects identical to that of FIGURE 1 except for modifications in the vessel 28′ and the provision of a switching valve 48.

Vessel 28′ is closed at the bottom and functions as a collection chamber.

Valve 48, in one position (as shown), connects conduits 32 and 24 for recirculation of etching fluid. In its alternate position valve 48 connects conduit 24 to a source 50 of rinse water and connects conduit 32 to a receptacle or drain (not shown).

In the operation of apparatus 10′, valve 22 is adjusted to achieve a flow rate insufficient to carry off any wafers in vessel 12 (except, if desired, undersized rejects) but high enough to keep the wafers in motion and prevent their piling up. This assures uniformity of etching. When etching is complete, valve 48 is turned to the alternative position with the result that the entire system is flushed with rinse water, thus immediately terminating the etching process. After rinsing, valve 22 may be opened to allow sufficient flow to carry the wafers into vessel 28′.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A method of etching platelets of a given material to a preselected thickness dimension, comprising: introducing platelets of greater than preselected thickness into a confined body of etchant fluid flowing vertically upward in non-turbulent fashion; adjusting the Reynolds number of the fluid flow system so that the platelets of the desired thickness are carried upwardly by the fluid flow while thicker platelets remain to be further etched until the desired thickness is attained; and collecting platelets carried along by the fluid flow and promptly terminating the etching action thereof.

2. In combination with a method of manufacturing semiconductor devices embodying wafers of semiconductor material of predetermined thickness, a method of fabricating such wafers, comprising: introducing platelets of semiconductor material of greater than said predetermined thickness into a confined body of etchant fluid flowing vertically upward in non-turbulent fashion; adjusting the Reynolds number of the fluid flow system so that platelets etched to the predetermined thickness will be carried upwardly by the fluid flow while thicker platelets remain to be etched until the desired thickness is attained; and diverting platelets carried upwardly by the fluid flow into a body of rinsing fluid to terminate the action of the etching fluid.

3. The method according to claim 2 wherein the Reynolds number is adjusted by adjustment of the flow rate.

4. The method according to claim 2 wherein the Reynolds number is adjusted by adjustment of the viscosity of said fluid and control of the flow rate thereof.

5. Apparatus for automatically etching semiconductor wafers to a predetermined thickness, comprising: a vertically elongated vessel having an inlet opening at the bottom and an outlet opening at the top, the vessel containing a fluid etching medium and being shaped to promote non-turbulent flow thereof from said inlet to said outlet opening; an inlet and an outlet conduit connected to said inlet and outlet openings, respectively; a wafer-collecting unit comprising a reflux chamber and a rinsing chamber, the reflux chamber being disposed vertically above the rinsing chamber and having a relatively small opening at the bottom in communication with the rinsing chamber through a constricted passage entering the top of said rinsing chamber, said outlet conduit from said vessel extending downwardly into said reflux chamber and terminating in an outwardly flared portion approximately midway between the top and bottom of said reflux chamber; a recirculating conduit, one end of which extends downwardly into said reflux chamber and terminates a substantial distance above the terminus of said outlet conduit; pump means connected between the other end of said recirculating conduit and said inlet conduit for circulating said fluid etching medium upwardly through said vessel; flow rate control means in said inlet conduit; and means for introducing said wafers into said inlet conduit.

6. Apparatus for automatically etching semiconductor wafers to a predetermined thickness, comprising: a vertically elongated vessel, generally symmetrical about its vertical axis, having a centrally located inlet opening at the bottom, the walls of said vessel sloping gradually inwardly toward said inlet opening; means defining an outlet opening at the top of said vessel, the vessel being shaped to provide a rounded approach to said outlet opening; an inlet and an outlet conduit connected to said inlet and outlet openings, respectively; a wafer-collecting unit comprising a reflux chamber and a rinsing chamber, the reflux chamber being disposed vertically above the rinsing chamber and having a relatively small bottom opening in communication with the rinsing chamber through a constricted passage entering the top of said rinsing chamber; said outlet conduit from said vessel extending downwardly into said reflux chamber and terminating in an outwardly flared portion approximately midway between the top and bottom of said reflux chamber; a recirculating conduit, one end of which extends downwardly into said reflux chamber and terminates a substantial distance above the terminus of said outlet conduit; pump means connected between the other end of said recirculating conduit and said inlet conduit for circulating fluid upwardly through said vessel; flow rate control means in said inlet conduit; and means for introducing said wafers into said inlet conduit.

References Cited in the file of this patent

UNITED STATES PATENTS

| | | |
|---|---|---|
| 1,069,214 | Wingett | Aug. 5, 1913 |
| 1,318,902 | Nakamura | Oct. 14, 1919 |
| 2,416,716 | Ross | Mar. 4, 1947 |
| 2,417,179 | Ross | Mar. 11, 1947 |
| 2,534,338 | Caroselli | Dec. 19, 1950 |
| 2,556,017 | Vonada | June 5, 1951 |
| 2,690,383 | Bradshaw | Sept. 28, 1954 |
| 2,827,723 | Clark | Mar. 25, 1958 |

FOREIGN PATENTS

| | | |
|---|---|---|
| 709,537 | Great Britain | May 26, 1954 |

OTHER REFERENCES

Unit Operations, Brown et al., 1950, pp. 86 and 87, published by Wiley & Sons, N.Y.